(12) United States Patent
Ulsamer

(10) Patent No.: US 11,017,618 B2
(45) Date of Patent: May 25, 2021

(54) SYSTEMS, METHODS, AND APPARATUSES FOR PROCESSING VEHICLE PERFORMANCE DATA

(71) Applicant: Holley Performance Products, Inc., Bowling Green, KY (US)

(72) Inventor: Marius Ulsamer, Burnaby (CA)

(73) Assignee: Holley Performance Products, Inc., Bowling Green, KY (US)

(*) Notice: Subject to any disclaimer, the term of this patent is extended or adjusted under 35 U.S.C. 154(b) by 141 days.

(21) Appl. No.: 15/995,905

(22) Filed: Jun. 1, 2018

(65) Prior Publication Data

US 2018/0357842 A1    Dec. 13, 2018

Related U.S. Application Data

(60) Provisional application No. 62/518,182, filed on Jun. 12, 2017.

(51) Int. Cl.
   *G07C 5/08*        (2006.01)
   *G07C 5/00*        (2006.01)
   (Continued)

(52) U.S. Cl.
   CPC .......... *G07C 5/0825* (2013.01); *G06T 11/203* (2013.01); *G06T 11/206* (2013.01);
   (Continued)

(58) Field of Classification Search
   CPC ......... G06T 2200/24; G06T 2219/2012; G06T 17/05; G06T 19/00; G06T 11/203;
   (Continued)

(56) References Cited

U.S. PATENT DOCUMENTS 6,020,851 A * 2/2000 Busack ................. G01S 5/0027
                                                   340/323 R
6,205,395 B1   3/2001 Young et al.
(Continued)

FOREIGN PATENT DOCUMENTS

EP       1810199 A2    7/2007
EP       2991044 A1    3/2016
(Continued)

OTHER PUBLICATIONS

U.S. Appl. No. 62/518,182 entitled "Systems, Methods, and Apparatuses for Processing Vehicle Performance Data" filed Jun. 12, 2017.
(Continued)

*Primary Examiner* — Anthony R Jimenez
(74) *Attorney, Agent, or Firm* — Middleton Reutlinger

(57) ABSTRACT

Methods, apparatus, systems, and computer-readable media are provided for processing vehicle-related data received from one or more smart tracker devices connected to one or more vehicles. The smart tracker devices can be connected to one or more sensors that can provide an output according to operating conditions of the vehicles. Data from the sensors can be transmitted from the smart tracker devices to a server device and/or a portable computing device for further processing. The portable computing device can include an application for visualizing the data in three dimensions. The application can include an interface that can provide a three-dimensional visualization of a track on which a vehicle is traveling, and map the data to a shape of the track in order to provide an indication of how the data changed as the vehicle traveled along the track.

20 Claims, 8 Drawing Sheets

(51) Int. Cl.
*G06T 11/20* (2006.01)
*G06T 19/00* (2011.01)
*G06T 17/05* (2011.01)
*H04W 76/15* (2018.01)

(52) U.S. Cl.
CPC .............. *G06T 17/05* (2013.01); *G06T 19/00* (2013.01); *G07C 5/008* (2013.01); *G06T 2200/24* (2013.01); *G06T 2219/2012* (2013.01); *H04W 76/15* (2018.02)

(58) Field of Classification Search
CPC ...... G06T 11/206; G06T 11/20; H04W 76/15; G06C 5/008; G07C 5/0825; G07C 5/00; G07C 5/08
USPC ........................................................ 701/32.1
See application file for complete search history.

(56) References Cited

U.S. PATENT DOCUMENTS

| | | | |
|---|---|---|---|
| 6,304,814 B1 | 10/2001 | Masters et al. | |
| 6,741,925 B2 | 5/2004 | Masters et al. | |
| 9,026,343 B2* | 5/2015 | Mays ................ | G01C 21/3492 701/110 |
| 9,441,571 B2 | 9/2016 | Petersen et al. | |
| 9,475,494 B1* | 10/2016 | MacArthur ........... | B60W 10/18 |
| 9,476,494 B2 | 10/2016 | Moune et al. | |
| 9,520,006 B1 | 12/2016 | Sankovsky et al. | |
| 9,727,325 B2 | 8/2017 | Mizell et al. | |
| 9,756,684 B2* | 9/2017 | Tammisetti ........... | H04W 88/06 |
| 2005/0251307 A1* | 11/2005 | Graf ........................ | G07C 1/22 701/33.4 |
| 2012/0306907 A1* | 12/2012 | Huston .............. | G06K 9/00671 345/619 |
| 2015/0317243 A1 | 11/2015 | Green et al. | |
| 2017/0341603 A1 | 11/2017 | Milliken | |

FOREIGN PATENT DOCUMENTS

| | | |
|---|---|---|
| WO | 20060023713 A2 | 3/2006 |
| WO | 20180231622 A1 | 6/2018 |

OTHER PUBLICATIONS

Korean Intellectual Property Office, International Search Report and Written Opinion for Application No. PCT/US2018/036429 dated Sep. 21, 2018.
U.S. Appl. No. 16/118,606 entitled "Systems, Methods, and Apparatuses for Controlling Engine Operations" filed Aug. 31, 2018.
www.racecloud.net; Go Kart Bundle; published Apr. 14, 2014 [information retrieved from Internet Wayback Machine].
www.autosportslab.com; Data Acquisition & Telemetry, published Nov. 27, 2013 [information retrieved from Internet Wayback Machine].
www.race-technology.com; Products, published Dec. 26, 2015 [information retrieved from Internet Wayback Machine].
European Patent Office, Notification of data mentioned in Rule 19(3) EPC in EP App. No. 18816843.9 dated Jan. 17, 2020.
European Patent Office, Communication pursuant to Rules 161(2) and 162 EPC in EP App. No. 18816843.9 dated Feb. 5, 2020.
European Patent Office, Communication of European Publication Number and information on the application of Article 67(3) EPC in EP App. No. 18816843.9 dated Mar. 25, 2020.
Australian Patent Application No. 2018286538 filing date Jun. 7, 2018 (national stage entry Dec. 17, 2019).
European Patent Application No. 18816843.9 filing date Jun. 7, 2018 (national stage entry Dec. 13, 2019).
The International Bureau of WIPO, International Preliminary Report on Patentability dated Dec. 17, 2019.
Anonymous: Telemetry Uses Data Visualization to Take Race Cars to the Next Level—Rock Content, retrieved from the internet, XP055778131, URL: https://rockcontent.com/blog/telemetry-uses-data-visualization-to-take-race-cars-to-the-next-level/ Jun. 27, 2013.
European Patent Office, Communication/European Search Report dated Mar. 11, 2021 for application No. 18816843.9, 10 pages.
European Patent Office; Communication pursuant to Rules 70(2) and 70a(2) EPC for EP Application No. 18816843.9 dated Mar. 30, 2021.

* cited by examiner

SYSTEMS, METHODS, AND APPARATUSES FOR PROCESSING VEHICLE PERFORMANCE DATA

CLAIM TO PRIORITY

This non-provisional patent application claims priority to and benefit of, under 35 U.S.C. § 119(e), U.S. Provisional Patent Application Ser. No. 62/518,182, filed Jun. 12, 2017 and titled "Systems, Methods, and Apparatuses for Processing Vehicle Performance Data", all of which is incorporated by reference herein.

TECHNICAL FIELD

The embodiments described herein generally relate to visualizing and comparing vehicle performance. Specifically, the embodiments relate to using a smart device on a vehicle visualize and compare performance metrics associated with the vehicle.

BACKGROUND

Vehicle performance can be difficult to track in real-time as there are a number of rapidly changing variables that contribute to how a vehicle is performing at any given time. Visualizing such variables in real-time can cause process latency, which can result in certain data being neglected. As a result, a driver that is relying on such data while operating the vehicle can miss out on opportunities to improve performance. Furthermore, someone observing data corresponding to a race between multiple vehicles may not receive an accurate snapshot of how the vehicles performed during a race because the data was not effectively collected. In some instances, without any effective means for filtering data, certain data can cause anomalies that can render subsequent processes unreliable.

SUMMARY

The described embodiments relate to systems, methods, and apparatus for visualizing vehicle performance based on data received from one or more smart tracker devices connected to one or more vehicles traveling along a track. A smart tracker device can be connected to one or more sensors that are disposed at different locations throughout a vehicle in order to provide signals indicative of operating conditions. Data collected by the smart tracker device can be transmitted over a network connection such as, for example, a Bluetooth connection, to a computing device such as, for example, a cellular phone or tablet computer. In some implementations, the data collected by the smart tracker device can be transmitted over a network connection, such as, for example, a Wi-Fi connection or an LTE connection, to a server, which can provide data to a computing device. The computing device can include an application for processing the received data and generating display elements at an interface of the computing device based on the received data. In some implementations, the computing device can process the data and transmit the data to a separate device that includes a display device (e.g., a display device within a vehicle) for displaying display elements based on the processed data. The display elements can include two-dimensional (2D) and three-dimensional (3D) display elements, such as a representation of a portion of the track along which a vehicle is traveling. The portion of the track can be displayed with shading changes, color changes, and/or dimension changes corresponding to how the one or more operating conditions of the vehicle are fluctuating as the vehicle is traveling along the track. The track can be displayed in layers that represent data received during a current lap, and previous laps the vehicle performed along the track.

The portable computing device can transmit at least a portion of the received data to a remote device, such as a server device, in order to preserve computational resources at the portable computing device. The server device can process data from multiple smart tracker devices simultaneously using multi-threading processes. The remote device can transmit data (e.g., operating metrics) to one or more client devices simultaneously and also store the data for subsequent processes, such as comparing current and past performances of vehicles.

In some embodiments, a method implemented by one or more processors is set forth as including steps such as receiving, via a first network connection, data from one or more smart tracker devices connected to one or more vehicle. The steps can further include causing display elements to be displayed at an interface of a computing device based on the data received from the one or more smart tracker devices, and transmitting, via a second network connection, at least a portion of the data to a remote device for processing. The steps can further include receiving, via the second network connection, processed data from the remote device, and causing additional display elements to be displayed at the interface based on the processed data from the remote device. In some embodiments, each of the one or more smart tracker devices can be connected to one or more sensors that are responsive to operating conditions of the vehicle. The additional display elements can include a representation of a track on which the vehicle is traveling. Furthermore, the representation of the track can include colors that change across the representation of the track based on variations in the processed data. The variations in the processed data can be time differences between a current lap being performed by the vehicle on the track and a historical lap data stored by the remote device. In some embodiments, the additional display elements include a trend line that extends along a representation of a portion of a track on which the vehicle is traveling. Furthermore, the method can include receiving an input for modifying an orientation of the representation of the portion of the track in three dimensions, and causing the representation of the portion of the track to be re-oriented according to the received input. The first network connection can be a Bluetooth connection and the second network connection can be an LTE connection or a WiFi connection. The method can be embodied as instructions stored in a non-transitory computer readable medium, or in a memory of a computing device that includes one or more processors.

DETAILED DESCRIPTION OF THE INVENTION

Figure 1:
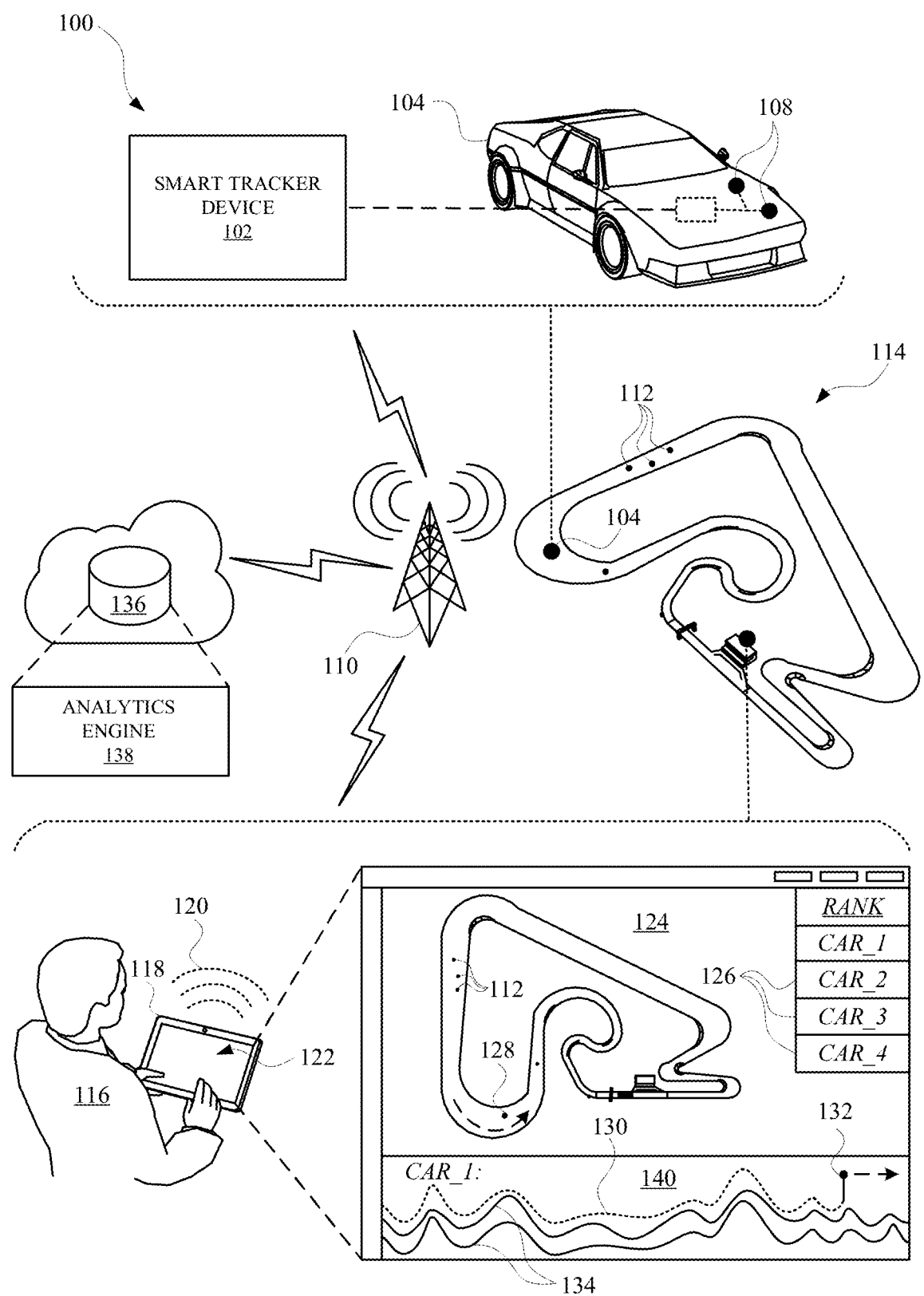
FIG. 1 illustrates a system for tracking, analyzing, and displaying race related data using a smart tracker device.

FIG. 1 illustrates a system 100 for tracking, analyzing, and displaying race related data using a smart tracker device 102. The smart tracker device 102 can be attached to a vehicle 104 capable of traveling about a race track 114. The smart tracker device 102 can include or be connected to one or more sensors 108 for measuring operating conditions and tracking performance of the vehicle 104. The sensors 108 can include multiple different sensors that are capable of providing data to the smart tracker device 102 as the vehicle 104 is traveling about a race track 114. For example, the sensors 108 can include a pedal position sensor, a pedal pressure sensor, a steering input sensor, a wheel speed sensor, an engine rotations per minute (RPM) sensor, an engine temperature sensor, a magnetic lap time sensor, a tire temperature sensor, an accelerometer, a gyroscope, a weather sensor, a battery charge sensor, an infrared sensor, a chemical sensor, a fluid sensor, a magnetic sensor, an optical sensor, a navigation sensor, a position sensor, a proximity sensor, and/or any other sensor capable of providing data suitable for tracking properties of an automobile. The sensors 108 can be in communication with one or more processors of the smart tracker device 102. The processor can analyze the data from the sensors 108 and/or transmit the data to a separate device, such as a portable computing device 118 for analysis.

The smart tracker device 102 can include one or more transmitters capable of communicating over multiple different communication mediums such as Wi-Fi, Bluetooth, long-term evolution (LTE), Zigbee, wired, and/or any other communication medium suitable for transmitting data. In some implementations, the smart tracker device 102 can include a global positioning system (GPS) receiver capable of carrier phase measurements for providing precise location data about the vehicle 104. Data from the sensors 108 and/or the GPS receiver can be processed at the processor of the smart tracker device 102 and/or transmitted to the portable computing device 118 over a network 110, such as the internet. In some implementations, data from the sensors 108 and/or the GPS receiver can be transmitted directly to the portable computing device 118 via short-range wireless communications (e.g., a Bluetooth connection). Thereafter, the portable computing device 118 can transmit at least some portions of the data over the network 110 to a remote device 136 for processing.

In some implementations, the smart tracker device 102 can include multiple channels for simultaneously receiving and/or analyzing sensor data. For example, data from the GPS receiver and sensors 108 can provide multiple different channels with data for determining GPS position, ground speed, wheel RPM, lateral acceleration data, longitudinal acceleration data, engine RPM, engine temperature, magnetic lap sensor data, battery voltage data, tire temperature for each tire, brake pedal data, steering angle, air temperature, barometric pressure and/or any other vehicle related data. Other metrics can also be calculated from the sensor and GPS data such as GPS based longitudinal and/or lateral acceleration, engine power, tire slippage, grip reserve, inverse corner radius of turns, speed adjusted steering, miles per hour (MPH) and/or RPM.

In some implementations, the smart tracker device 102 and/or the portable computing device 118 can communicate with a remote device 136, such as a server, that includes an analytics engine 138. The analytics engine 138 can process the data provided by the smart tracker device 102 and/or the portable computing device 118 in order to conserve computational resources of the smart tracker device 102 and/or the portable computing device 118. In some implementations, the analytics engine 138 can be stored at the portable computing device 118, and the analytics engine 138 can process data provided by the remote device 136 and/or the smart tracker device 102. In some implementations, in order to more accurately calculate certain metrics and conserve computational resources, the analytics engine 138 can filter the data provided by the smart tracker device 102. The analytics engine 138 can filter the received data by comparing the received data to other data being provided by the smart tracker device 102. Comparing the received data to the other data can include identifying outliers or noise in the received data that does not correlate to the other data. In this way, any further processing of the data will not be impeded by noise or other inconsistent data, thereby mitigating errors.

In some implementations, the portable computing device 118 can include an application that can process data from the remote device 136 and/or the smart tracker device 102. The application can provide an interface 124 at a display 122 of the portable computing device 118. The interface 124 can allow a user 116 to interact with and view data processed by the remote device 136, the smart tracker device 102, and/or the portable computing device 118. For example, the interface 124 can provide graphical elements representing a track (e.g., race track 114), as well as an identifier 128 representing the vehicle 104 on the race track 114. The interface 124 can also identify other vehicles 112 that are on the race track 114 concurrently with the vehicle 104. Each of the other vehicles 112 can also include a smart tracker device 102, and the other smart tracker devices 102 can communicate with the portable computing device 118 over the network 110 or via the remote device 136. In this way, the user 116 will be able to simultaneously view and interact with data associated with multiple vehicles.

In some instances, the interface 124 can present the user 116 with a ranking of vehicles on the race track 114 according to one or more metrics, as generated by the analytics engine 138. For example, the application can cause the display 122 to present a ranking 126 of best track completion times according to historical and current data available to the remote device 136. Alternatively, the ranking 126 can provide the user 116 with a list of operating metrics of each vehicle before, during, or after a race, based on data collected by the smart tracker devices 102. Such metrics can include engine temperature, engine RPM, barometric pressure, battery charge, and/or averages of any metrics identified herein.

In some implementations, the application on the portable computing device 118 can provide a lap tracking interface 140. The lap tracking interface 140 can be presented simultaneous to the ranking 126 and the track/or provided in the interface 124. The lap tracking interface 140 can provide the user 116 with a real-time plot 130 of one or more metrics or sensor data as the vehicle 104 (e.g., "CAR_1") is operating on the race track 114. Furthermore, the lap tracking interface 140 can provide the user with historical plots 134 using historical data logged by the smart tracker device 102, the remote device 136, and/or the portable computing device 118. The historical data can include sensor data and/or metrics corresponding to previous times the vehicle 104 was operating on the race track 114. In this way, the user 116 is able to see how the vehicle 104 is performing during a current race compared to previous races. For example, the real-time plot 130 can represent engine RPM for the vehicle 104 during a current race and the historical plots 134 can represent engine RPM for the vehicle 104 during previous races.

A moving cursor 132 can act as a moving progress indicator that moves over the historical plots 134 as the vehicle 104 is traveling along the race track 114. In order to provide the moving cursor 132, the analytics engine 138 can compare position data from the GPS receiver to a mapping of the race track 114 to determine the real-progress of the vehicle 104 completing a lap of the race track 114. Furthermore, the analytics engine 138 can correlate the real-time progress of the vehicle 104 completing the race track 114 to sensor data and/or one or more metrics logged by the smart tracker device 102 and/or the remote device 136. The correlation can then be presented as the real-time plot 130, which can show how the sensor data or metric is changing over time. In some implementations, the moving cursor 132 can be controlled by a user 116 in order to identify values on the real-time plot 130. For example, a user 116 can press their finger on a portion of the real-time plot 130, and, in response, the cursor 132 can move to the portion of the real-time plot 130 and display a value corresponding to a point at the portion of the real-time plot 130.

Figure 2:
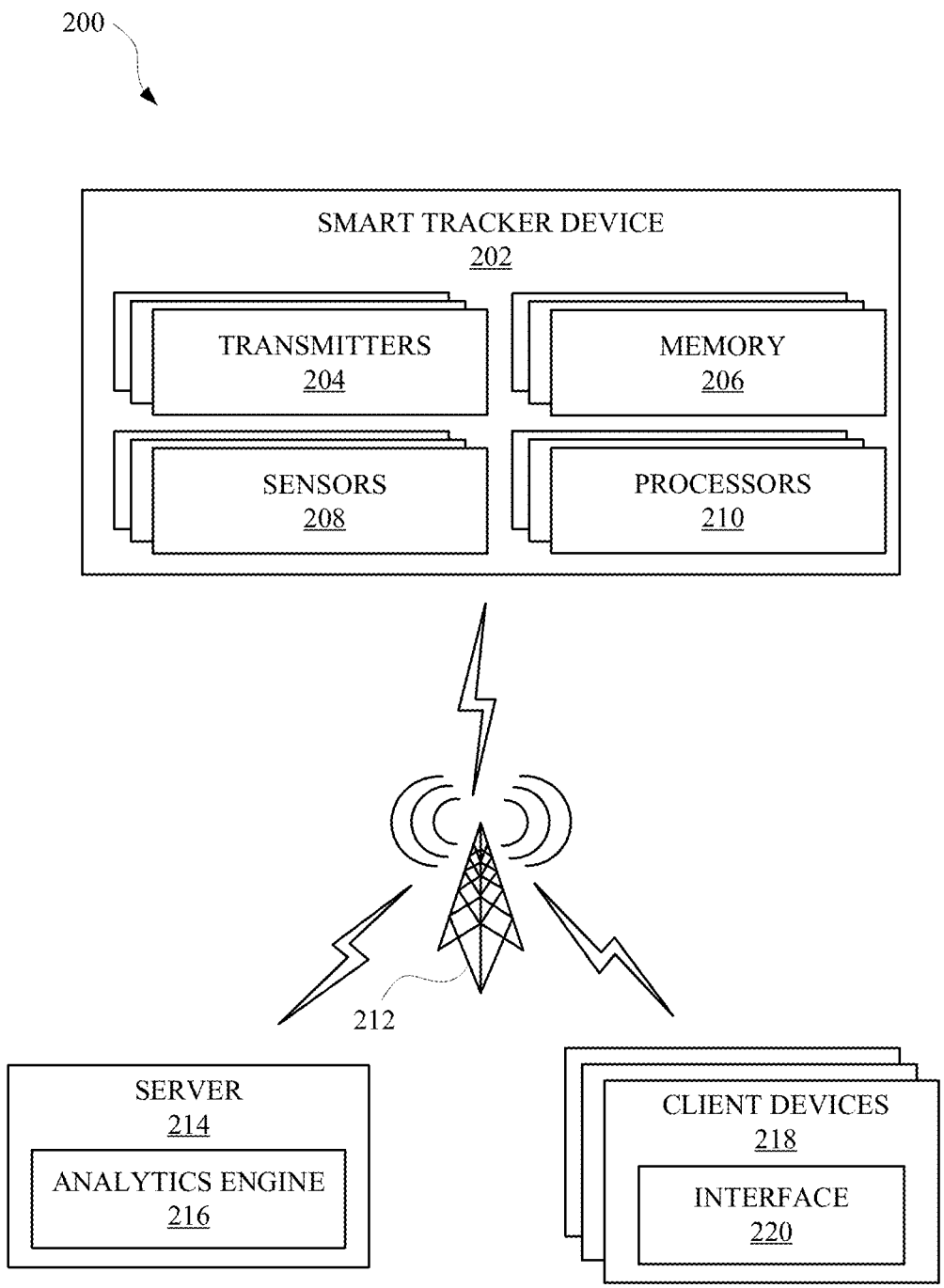
FIG. 2 illustrates a system for collecting, analyzing, and presenting race and vehicle related data.

FIG. 2 illustrates a system 200 for collecting, analyzing, and presenting race and vehicle related data. The system 200 can include a smart tracker device 202, which can include one or more transmitters capable of transmitting wireless and/or wired signals according to one or more different communications protocols such as, for example, Wi-Fi, Bluetooth, LTE, Zigbee, and/or any other communications protocols suitable for transmitting signals. The smart tracker device 202 can further include one or more sensors 208, such as any of the sensors described herein. The sensors 208 can provide signals in response to changing environmental conditions affecting the sensors 208, and the smart tracker device 202 can use the signals to generate data for further processing. For example, the sensors 208 can be connected to one or more processors 210, which can receive signals from the sensors 208 and convert the signals into usable data for creating data logs at the smart tracker device 202 and/or a separate device. The data can be stored in memory 206 of the smart tracker device 202. The memory 206 can include one or more memory devices that are in communication with one or more processors 210.

In some implementations, the smart tracker device 202 can communicate with a server 214 and/or one or more client devices 218 over a network 212, such as the internet. The smart tracker device 202 can communicate data that is based on signals transmitted by the sensors 208 in order that the server 214 and/or client devices 218 can further process the data. In some implementations, the server 214 can include an analytics engine 216, which can include one or more applications or scripts that operate according to multi-threading operations to process data from the smart tracker device 202 and/or the client devices 218. The analytics engine 216 can receive data related to performance of one or more vehicles as the vehicles traverse a race track or other course. The analytics engine 216 can identify differences between a most recent performance of a vehicle and past performances of the vehicle. The differences embodied in data can be transmitted from the server 214 to the client devices 218 over the network 212. In some implementations, the analytics engine 216 can operate at one or more of the client devices 218, and receive data from the server 214 and one or more smart tracker devices 202.

The client devices 218 can each present an interface 220 that illustrates the differences in the data. The interface 220 can be presented by an application that is associated with the smart tracker device 202. The application can allow a user to interact with the data from the analytics engine 216 and/or the smart tracker device 202 in order to compare performance and/or metrics associated with vehicles before, during, and/or after the vehicles perform a lap around a race track. In some implementations, the race track can be presented at the interface 220 with a number of different layers corresponding to a vehicle's performance during a particular lap or race around the race track. The layers can be based on sensor data provided by the smart tracker device 202 and/or analytic data provided by the analytics engine 216. The layers can be shaded, colored, or otherwise modified to reflect where in a particular lap (e.g., at a curve or straight-away) around a race track that the vehicle performed better, equal to, or worse than a best ranked lap or an average ranked lap. In some implementations, the layers can each correspond to different vehicles, and the layers can be shaded, colored, or otherwise modified to reflect where in a particular lap (e.g., at a curve or straight-away) each vehicle performed better, equal to, or worse than the best ranked vehicle. In this way, large amounts of data can be condensed into 2D or 3D display elements that can allow a user to draw a number of different conclusions about the data without having to waste human effort or additional computational resources of a computing device.

In some implementations, other sensor data collected at the smart tracker device 202 can be presented at the layers provided at the interface 220. For example, points on the track where each vehicle used their breaks can be identified at each vehicle's corresponding layer. In other instances, the layers of the race track can be modified to include indicators for steering angle, tire slip, longitudinal acceleration, latitudinal acceleration, and/or any other sensor data or metric discussed herein. Such indicators can correspond to measurements, changes, averages, differences from a previously recorded lap, and/or any other basis for comparing data.

Figure 3:
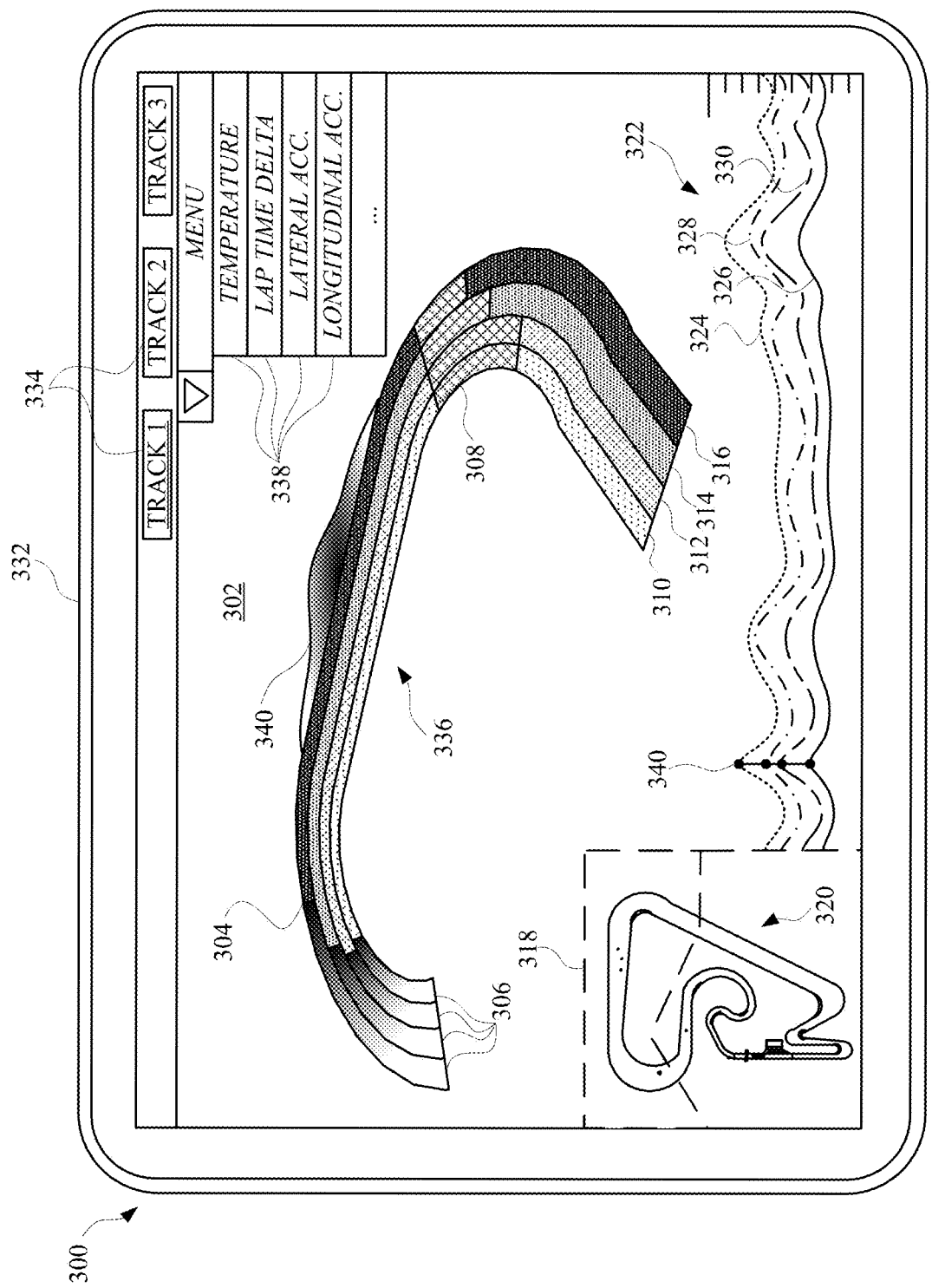
FIG. 3 provides a diagram of an interface for interacting with and visualizing data provided by a server and/or smart tracker device.

FIG. 3 provides a diagram 300 of an interface 302 for interacting with and visualizing data provided by a server and/or smart tracker device. The smart tracker device can be connected to one or more vehicles and collect data about the vehicles as the vehicles perform one or more laps around a race track, such as the race track 320 depicted in the interface 302. The smart tracker device can include one or more sensors connected at different portions of the vehicles, such as, for example, the engine, the tires, any fluid supply, and/or any other portion of the vehicles. Sensor data can be processed by the smart tracker device and/or transmitted to the server and/or the portable computing device 332 for further processing.

In some implementations, the portable computing device 332 can present current and historical data at the interface 302 about a vehicle in a variety of different ways. For example, the interface 302 can be presented by an application that is associated with a particular vehicle that has performed a lap around the track 320. A user can compare the performance of the vehicle at multiple different tracks by selecting one of the track icons 334. For example, track 320 can correspond to "TRACK 1" identified at the track icons 334. In some implementations, a user can select a track portion 318 for comparing a performance of the vehicle at the track portion 318 during a current lap and/or previous laps through the track portion 318. Specifically, the interface 302 can provide track layers 336 corresponding to different laps that the vehicle has traveled around the race track 320. For example, a first layer 310 can correspond to a lap that is currently being recorded by the smart tracker device or has most recently been recorded by the smart tracker device. The second layer 312, third layer 314, and fourth layer 316 can correspond to previous laps recorded by the smart tracker device. Each layer can be shaded in a way that is based on data collected from the smart tracker device during a respective lap.

In some implementations, a darker shaded region can indicate that the vehicle completed traversing the track portion 318 faster than compared to the other laps represented by the lighter shaded regions (e.g., the first layer 310, second layer 312, third layer 314 are lighter than the fourth layer 316, therefore the fourth layer 316 corresponds to the fastest lap). Furthermore, the track layers 336 can also include sections representing different data gathered from the smart tracker device during different laps. The different data can include tire slip data, which can be converted into tire slip data 308 indicating where the vehicle's tires began to slip during a turn on the race track 320. This allows the user or driver to learn how the vehicle was being operated to improve vehicle performance while traveling around the race track. The different data displayed at the track layers 336 can also include brake pedal data 306, which can indicate when the vehicle applied the brakes during each lap corresponding to the first layer 310, the second layer 312, the third layer 314, and the fourth layer 316. For example, point 304 of the fourth layer 316 can indicate when the vehicle began applying the brakes during the lap corresponding to the fourth layer 316. It should be noted that any of the shaded regions and/or hatched regions can be provided using any of the sensor data and/or metrics discussed herein. For example, the shaded regions can represent engine RPM of the vehicle during different laps and the hatched regions can correspond to lateral and/or longitudinal acceleration.

In some implementations, the interface 302 can include one or more trend lines 322, which can be simultaneously displayed with the track layers 336 and represent the same or different data than the track layers 336. The trend lines 322 can include a first trend line 324 corresponding to the first layer 310, a second trend line 328 corresponding to the second layer 312, a third trend line 330 corresponding to the third layer 314, and a fourth trend line 326 corresponding to the fourth layer 316. For example, the fourth trend line 326 can be based on data collected during the best lap time for the vehicle. The trend lines 322 can be generated such that changes in the trend lines 322 can overlap, in order to make identifying differences between laps more intuitive. Trend lines 322 can be overlapped, as further discussed herein, by identifying a reference lap, and mapping data to position data corresponding to the reference lap. In this way, certain features of the data, such as peaks Such data can include any of the sensor data and/or metrics discussed herein. In some instances, the fourth trend line 326 can be based on temperature data collected at the smart tracker device connected to the vehicle. In this way, the user or driver of the vehicle are able to visualize the temperature of vehicle for each lap, and see how the temperature compares to the data provided at the track layers 336.

In some implementations, each of the first trend line 324, the second trend line 328, the third trend line 330, and/or the fourth trend line 326 can correspond to different data recorded by the smart tracker device during a particular lap (e.g., a lap corresponding to the third layer 314). For example, the first trend line 324 and the second trend line 328 can correspond to temperature data and lap time delta (i.e., difference in time between a best lap and another lap), respectively. The data represented by the trend lines 322 can be modified by selecting the types of data at the menu items 338. For example, in response to a user selecting "LAP TIME DELTA" from the menu items 338, the interface 302 can provide a trend line corresponding to one or more laps completed by the vehicle. In some implementations, the data represented at the track layers 336 can be modified according to selections of menu items 338. For example, in response to the user selecting "LONGITUDINAL ACC.", the interface 302 can provide a layer that is shaped like the race track 320 and changes shading and/or fill according to how longitudinal acceleration of the vehicle changed during one or more laps.

In some implementations, the track layers 336 can represent data collected at smart tracker devices of multiple different vehicles. The data can be collected during a race where each of the vehicles were traveling about the race track 320 represented at the interface 302. For example, each of the first layer 310, the second layer 312, the third layer 314, and the fourth layer 316 can represent a different vehicle. In this way, differences in performance of each vehicle can be identified determined or analyzed via the interface 302. The trend lines 322 can also represent data collected from the smart tracker devices of the vehicles. For example, a user can select engine RPM from the menu items 338 and cause the trend lines 322 to illustrate how the engine RPM of each vehicle changed as the vehicles traveled along the track 320. Furthermore, the user can select lap time delta from the menu items 338 in order to see how the lap time delta (i.e., a difference between the best lap time for all vehicles and the lap time for a specified vehicle) for each vehicle changed as each vehicle traveled along the race track 320. Although the shaded areas in each layer of the track layers 336 is uniform for each layer, the color or darkness of each shaded area can change according to how the selected data or metric (e.g., lap time delta) changes. Furthermore, the brake pedal data 306 and/or tire slip data 308 can be based on the brake pedal data 306 and/or the tire slip data 308 collected from each smart tracker device of each of the different vehicles. However, it should be noted that the cross hatching at the portions of the track layers 336 representing the brake pedal data 306 and/or the tire slip data 308 can be based on any data collected by the smart tracker devices of the vehicles.

In some implementations, the track layers 336 can include a three-dimensional (3D) portion 340 that projects in a perpendicular direction from the track layers 336. A height of the 3D portion 340 can be proportional to sensor data or any other metric discussed herein. For example, in some implementations, the 3D portion 340 can correspond to a velocity of a vehicle as the vehicle is traveling around the race track 320. By providing data in three dimensions, a user can quickly make conclusions about the performance of a vehicle, without wasting computational resources by navigating through multiple different interfaces.

Figure 4:
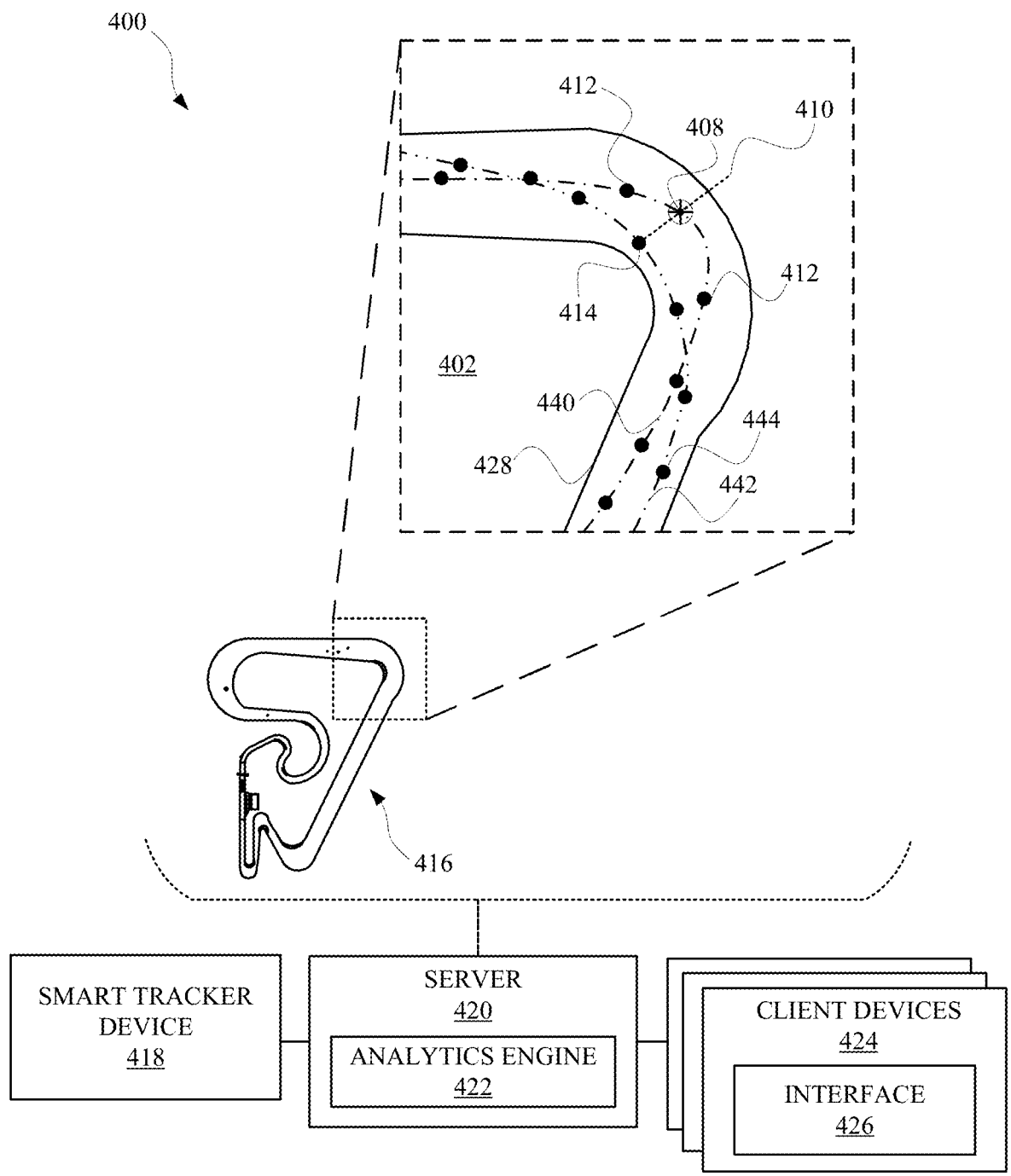
FIG. 4 illustrates a system for determining a time delta for lap times of a vehicle.

FIG. 4 illustrates a system 400 for determining a time delta for lap times of a vehicle. The time delta calculation provided in FIG. 4 can provide accurate comparisons between lap times of one or more vehicles. A smart tracker device 418 can be connected to a vehicle for collecting data that identifies a location of the vehicle. For example, the smart tracker device 418 can include a GPS receiver that can collect coordinates of the vehicle as the vehicle is performing a lap around a race track 416. The coordinates, as well as time stamps associated with the coordinates, can be transmitted to a server 420 and/or one or more client devices 424 for further processing. In some instances, the server 420 can process the coordinate data and time stamps at an analytics engine 422 of the server 420. The coordinate data and/or times stamps can be processed in order to determine a reference position of the vehicle as the vehicle travels along the race track 416. The reference position can indicate a progress of the vehicle as the vehicle travels around the race track 416, and can be used to map data collected during different laps of one or more vehicles around the race track 416. Such data mapping can be used to generate the track layers 336 and/or trend lines 322 discussed herein.

Processing the coordinate data and time stamps can include mapping a trajectory of the vehicle as the vehicle performs a lap around the race track 416. Historical data can be processed to create a reference trajectory 440 for the vehicle. The reference trajectory 440 can be based on multiple historical coordinates 412 associated with the movement of a vehicle around the race track 416. Furthermore, incoming or recent data can be processed to create a current trajectory 442 for the vehicle. The current trajectory 442 can be based on multiple incoming or recent coordinates 444. The reference trajectory 440 and the current trajectory 442 can correspond to laps performed at a portion 402 of the race track 416 at different times.

In order to calculate a time delta for the reference trajectory 440 and the current trajectory 442, a normal line 410 can be projected from a point 414 on the current trajectory 442. The normal line 446 can extend to the reference trajectory 440 to create an intersection 408. Each of the point 414 and the point at the intersection 408 can correspond to times when the vehicle was traveling around the race track 416. The time delta can be calculated as a difference between a time stamp corresponding to the point 414 and a time stamp corresponding to the intersection 408. When the reference trajectory 440 corresponds to the best lap performed by the vehicle, the time delta can indicate whether the vehicle, at the current trajectory 442, is performing better or worse than when the vehicle was performing the best lap. In some implementations, if a time stamp does not explicitly exist for the point at the intersection 408, the time stamp can be estimated using the closest historical coordinates 412 to the intersection 408. The closest historical coordinates 412 can be used to create a curve fitted for the historical coordinates 412, and time values can then be assigned to the curve between the closest historical coordinates 414. A time corresponding to the intersection 408 can then be identified for purposes of calculating the time delta.

Time delta data can be generated from multiple different points of a current trajectory 442 and transmitted to one or more client devices 424. The client devices 424 can include an application associated with the smart tracker device 418 for displaying an interface 426 that includes data and metrics based on data collected by the smart tracker device 418 at one or more vehicles. For instance, the interface 426 can provide time delta data corresponding to a difference between a most recent lap performed by a vehicle and a best lap performed by the same vehicle or a different vehicle. The time delta data can be presented as color changes that are mapped over a 2D or 3D image of the race track 416, as illustrated in FIG. 3. Alternatively, the time delta data can be presented as height changes of 3D portion of the 3D image of the race track 416, such as the 3D portion 340 illustrated in FIG. 3. However, it should be noted that the time delta data can be presented according to any of the methods provided herein, and/or any other method suitable for presenting race data.

In some implementations, the process for calculating the time delta can be used to calculate differences in sensor data or other metrics associated with different laps performed by the same, or different vehicles. For example, an engine temperature delta can be calculated for different laps performed by a vehicle. The engine temperature delta can be generated by mapping a first set of engine temperature data along the current trajectory 442, and mapping a second set of engine temperature data along a reference trajectory 440 (e.g., a trajectory of a best lap for the vehicle). For one or more data points along the current trajectory 442, a normal line can be projected perpendicular to a data point such that the normal line 446 intersects or reaches the reference trajectory 440. An engine temperature of the vehicle corresponding to the intersection can then be identified, and a difference between the engine temperature at the intersection and at the data point can be calculated. This engine temperature delta can then be presented at an interface that includes a map of the race track 416 (e.g., track layers 336) in order to illustrate where the differences in temperature were more or less extreme.

Figure 5:
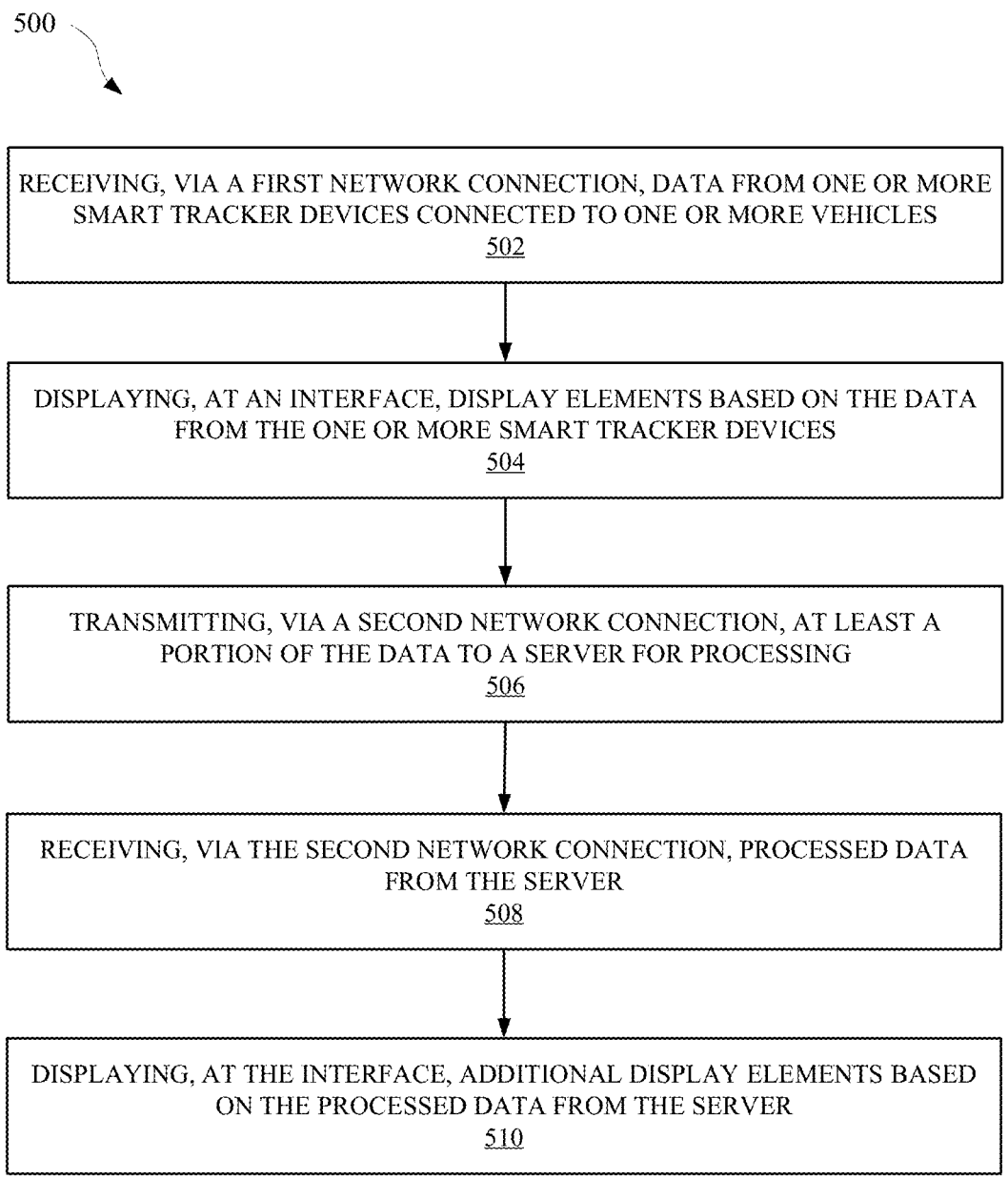
FIG. 5 illustrates a method for processing data collected by one or more smart tracker devices attached to one or more vehicles, respectively.

FIG. 5 illustrates a method 500 for processing data collected by one or more smart tracker devices attached to one or more vehicles, respectively. The method 500 can be performed by a portable computing device, such as a cellular phone, a server device, and/or any other device capable of processing data collected at a vehicle. The method 500 can include a block 502 of receiving, via a first network connection, data from one or more smart tracker devices connected to one or more vehicles. The smart tracker device can be connected to one or more sensors that are disposed at different locations within the vehicle in order to track operating conditions of the vehicle. The smart tracker device can also include one or more transmitters for sending and receiving data (e.g., GPS data) via one or more different network protocols.

At block 504, display elements based on the received data from the one or more smart tracker devices can be displayed at an interface. The display elements can be a portion of a race track on which the vehicle was traveling when the received data was collected by the smart tracker device. The received data can be used by the portable computing device to modify the portion of the race track to include gradients, colors, size changes, and/or any other variations in appearance that can indicate how the performance of the vehicle changed while traveling along the race track 114.

At block 506, at least a portion of the data received from the smart tracker device can be transmitted to a server for processing. The portable computing device can offload tasks to the server in order to preserve computational resources of the portable computing device. The server can be programmed to perform tasks such as generate differences (e.g., delta data) between data collected during laps performed by one or more vehicles, as discussed with respect to FIG. 4. For example, the server can generate time delta data corresponding to a most recent lap performed by a vehicle and a previous lap (e.g., a best lap) performed by the same vehicle.

At block 508, the processed data can be received from the server via the second network connection. It should be noted that the first network connection and the second network connection can be the same network connection or different network connections. For example, in some implementations, the first network connection can be a low energy connection, such as a Bluetooth connection, and the second network connection can be an LTE connection or a WiFi connection.

At block 510, display elements based on the processed data from the server can be displayed at the interface. The display elements based on the processed data can include portions of the race track displayed at the interface and/or trend lines indicating how the processed data changed the vehicle traveled around the race track. In some implementations, the display elements can be 3D elements that can be rotated according to inputs received at the interface (e.g., touch inputs and/or inputs provided by a peripheral device such as a stylus or mouse).

Figure 6:
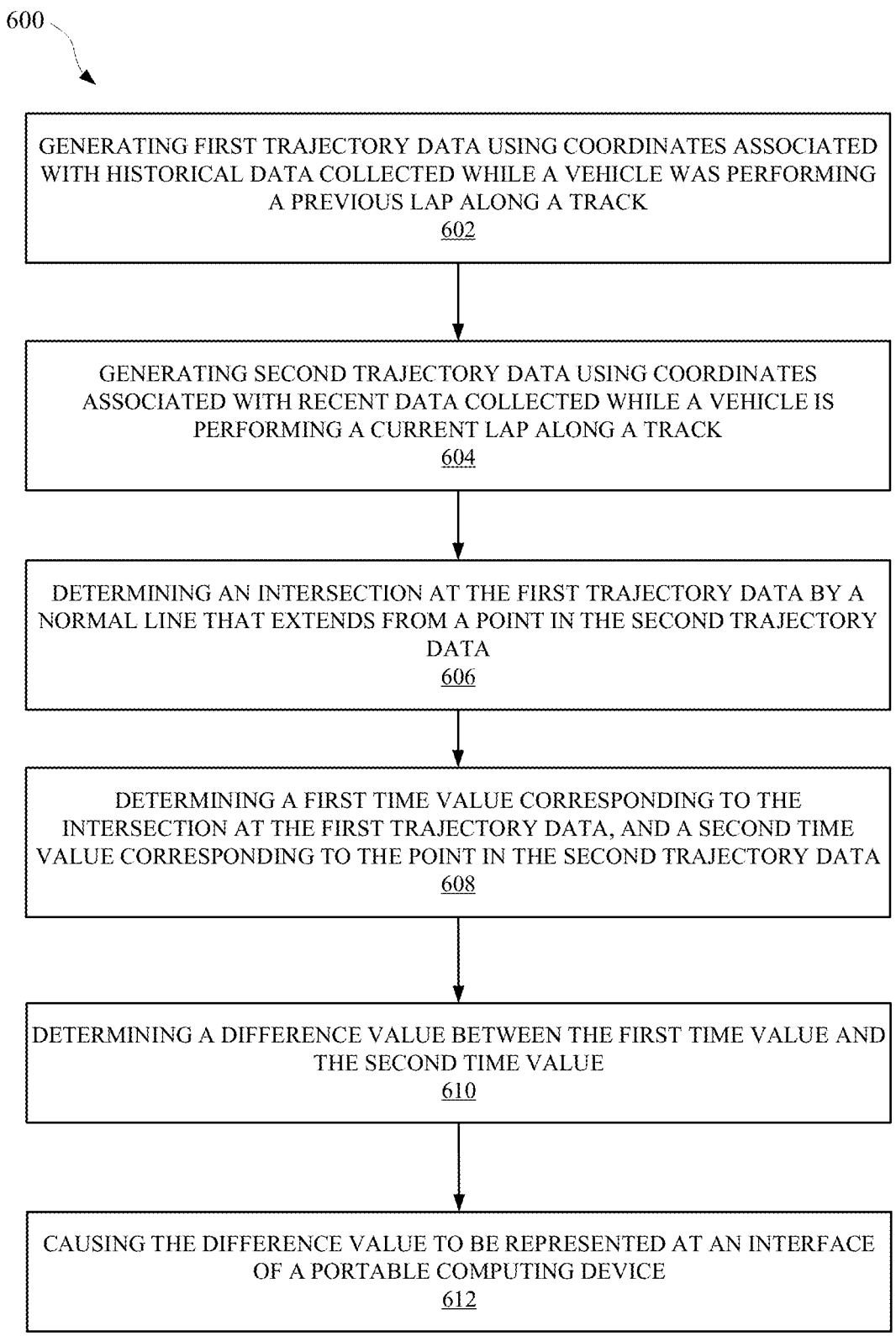
FIG. 6 illustrates a method for calculating a difference between lap data that is gathered by one or more smart tracker devices connected to one or more vehicles, respectively.

FIG. 6 illustrates a method 600 for calculating a difference between lap data that is gathered by one or more smart tracker devices connected to one or more vehicles, respectively. The method 600 can be performed by a portable computing device, a server device, and/or any other device capable of processing vehicle-related data. The method 600 can include a block 602 of generating first trajectory data using coordinates associated with historical data collected while a vehicle was performing a previous lap along a track. The historical data can be collected by a smart tracker device attached to the vehicle and programmed to collect GPS data as the vehicle is traveling along the track. The track can be any street or road (e.g., a race track, a city street, etc.) that is capable of supporting a vehicle while the vehicle is traveling along the street or road.

At block 604, second trajectory data can be generated using coordinates associated with recent data collected while a vehicle is performing a current lap along a track. The current lap can be a lap that is being performed by the vehicle in real-time, a lap that was most recently performed by the vehicle, or any other lap previously performed by the vehicle. It should be noted that the first trajectory data and the second trajectory data can correspond to data mappings in 2D or 3D coordinate space (e.g., a 2D or 3D matrix).

At block 606, an intersection of the first trajectory data by a normal line that extends from a point in the second trajectory data is determined. A normal line can refer to a function or data that corresponds to a line that is perpendicular to the second trajectory data at the point. The intersection can occur at a point of data in the first trajectory data or at a point between two points of data in the first trajectory data. If the intersection is between two points of data, the point of intersection can be estimated through a curve fitting, least squares method, or any other method for estimating a value of a point in 2D or 3D space.

At block 608, a first time value corresponding to the intersection at the first trajectory data is determined, and a second time value corresponding to the point in the second trajectory data is determined. The first time value and the second time value can be based on when the vehicle began performing each lap or traveling along a track. For example, the previous lap and the current lap can each start at a time value of 0, therefore, after the vehicle began performing the previous lap and the current lap, the time values would increase. Therefore, the first time value and the second time value can correspond to the same (or relatively the same) starting points.

At block 610, a difference value between the first time value and the second time value is determined. In other words, the first time value is subtracted from the second time value, or the second time value is subtracted from the first time value. In this way, a time delta for a point at the second trajectory data can be determined. In some implementations, a time delta can be calculated for multiple points in the second trajectory data in order to compare performance of the vehicle during different laps.

At block 612, the difference value is caused to be represented at an interface of a portable computing device. For example, when the method 600 is performed by a server device, the server device can transmit the difference value to an application at a portable computing device for displaying the different value. Alternatively, when the method 600 is performed by the portable computing device, the portable computing device can cause the application to present the difference value at a graphical user interface of the portable computing device. The difference value can be represented as one or more display elements, such as a trend line and/or gradients presented as a color, hatching, and/or shading at the interface (e.g., such as the interface 302 of FIG. 3).

Figure 7:
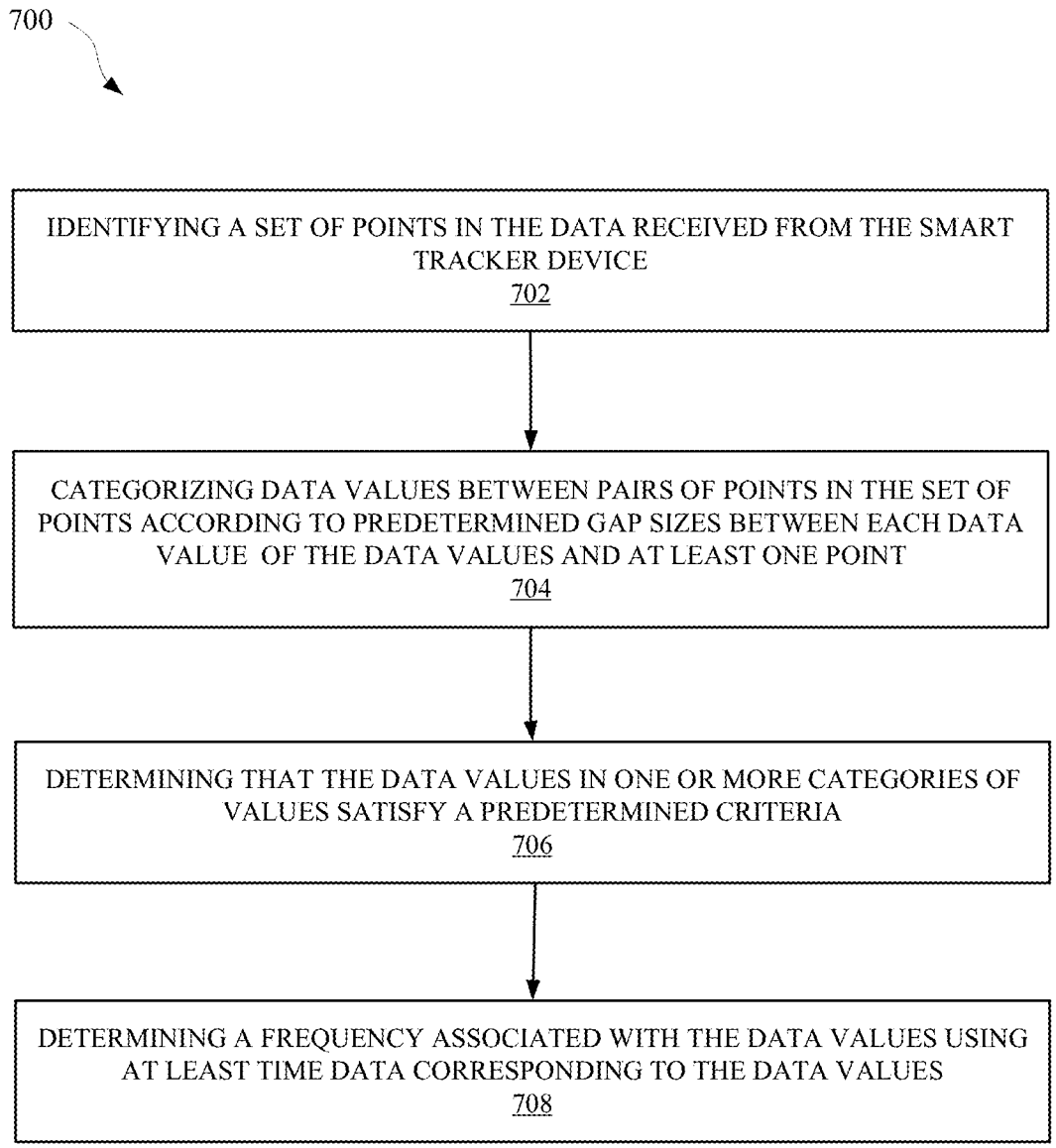
FIG. 7 illustrates a method for processing data to determine certain metrics that can be associated with vehicle performance.

FIG. 7 illustrates a method 700 for processing data to determine certain metrics that can be associated with vehicle performance. The method 700 can be performed by a server device, a portable computing device, and/or any other device capable of analyzing data. The method 700 can include processing data provided from one or more sensors connected to the smart tracker device. The sensors can be responsive to certain environmental conditions of the vehicle, such as motion, temperature, pressure, and/or any other environmental condition associated with the vehicle.

At block 702, a set of points is identified from the data received from the smart tracker device. The set of points can be randomly selected data from the received data. Alternatively, the set of points can be selected from the received data according to a predetermined algorithm that is not random. For example, the set of points can be selected according to a sampling frequency such that a point is selected from the data at multiple periods. In this way, the set of points will be a subset of the received data from the smart tracker device.

At block 704, data values between pairs of points in the set of points are categorized according to predetermined gap sizes between each data value of the data values and at least one point. For instance, the predetermined gap sizes can be a finite number of spaces between points (e.g., 2, 4, 8, 16, etc.). For a pair of points in the set of points, a data value at the second point from one point of the pair of points can be categorized as being at the second point. Additionally, for the pair of points in the set of points, a data value at the fourth point from the one point of the pair of points can be categorized as being at the fourth point. This process can be repeated for each gap size (e.g., 2, 4, 8, 16, etc.) until all data values between the pairs of points in the set of points are categorized, or until the data values in the one or more categories satisfy a predetermined criteria.

At block 706, a determination can be made that the data values in the one or more categories satisfy a predetermined criteria. The predetermined criteria can be defined by at least a total number of data values in one category reaching a threshold, or a summation of the data values in one category reaching a threshold. Alternatively, the predetermined criteria can be defined by totals of data values in multiple categories reaching one or more thresholds, or summation of the data values in multiple categories reaching one or more thresholds.

At block 708, a frequency associated with the data values can be determined using at least time data corresponding to the data values. For example, each of the categorized data values can be associated with a time stamp (e.g., a time when a sensor was measuring an operating condition of an engine). The categorized data values can be analyzed based on their time stamps to provide a frequency estimate for the categorized data values. The frequency estimate can correspond to an operating condition of the vehicle. For example, a sensor providing data to the smart tracker device can be responsive to rotations of the engine of the vehicle. Therefore, the method 700 can be used to determine a frequency of rotation of the engine (i.e., RPMs of the engine). Alternatively, the sensor providing data to the smart tracker device can be responsive to rotations of the wheels of the vehicle. Therefore, the method 700 can be used to determine a frequency of rotation of the wheels.

Figure 8:
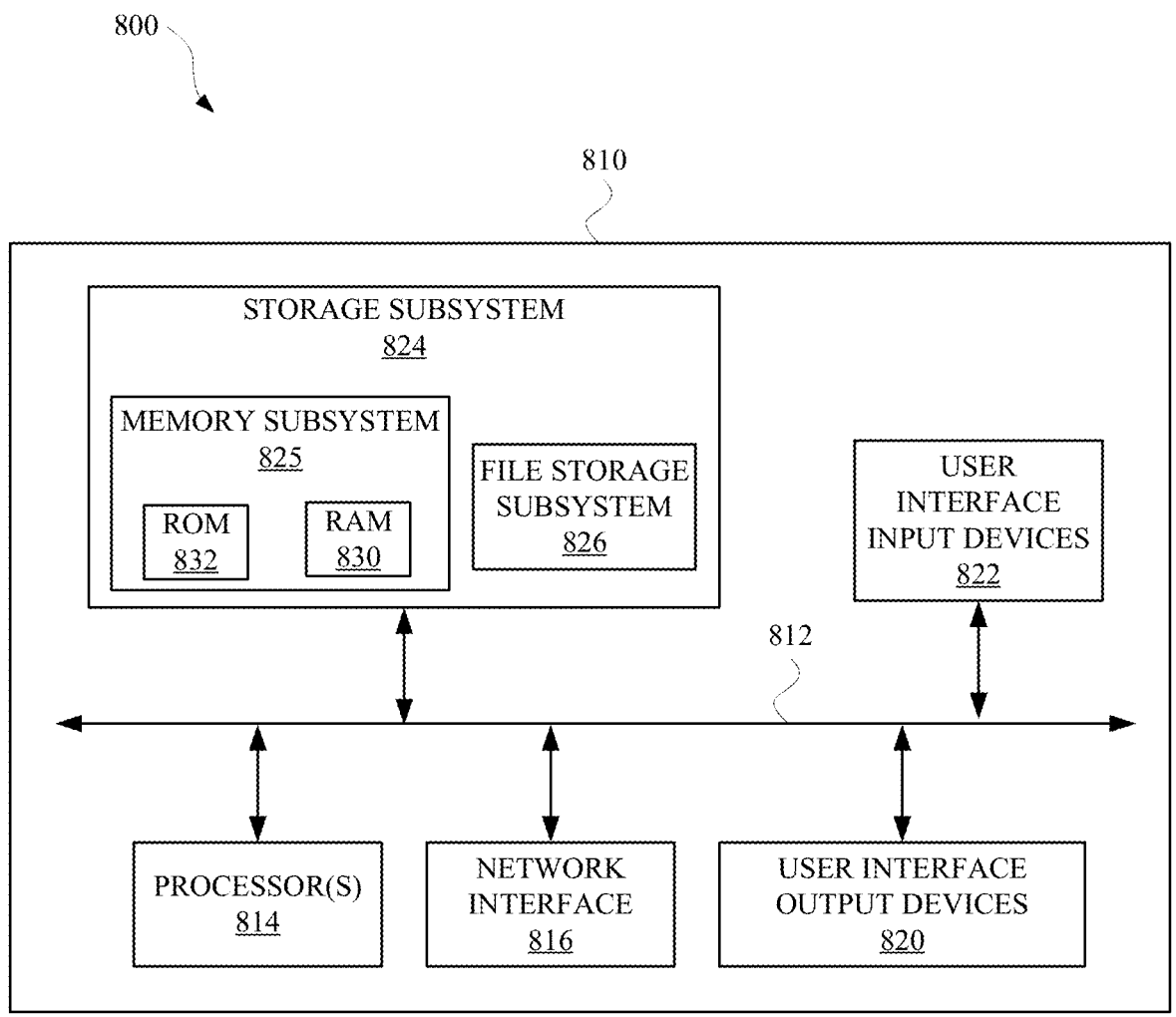
FIG. 8 is a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 500, 600, 700, and/or to implement one or more of the analytics engine 138, the remote device 136, the server 214, the server 420, the portable computing device 118, the smart tracker device 102, the smart tracker device 202, the smart tracker device 418, the portable computing device 332, the client devices 218, the client devices 424, and/or any other device discussed herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method implemented by one or more processors, the method comprising:
receiving, via a first network connection, data from multiple smart tracker devices connected to multiple vehicles traveling along a track,
wherein each smart tracker device of the multiple smart tracker devices is connected to one or more respective sensors that are responsive to one or more operating conditions of a respective vehicle of the multiple vehicles;
transmitting, via a second network connection, at least a portion of the data to a remote device for processing;
receiving, via the second network connection, processed data from the remote device;

causing display elements to be displayed at an interface of a computing device based on the data received from the multiple smart tracker devices,
   wherein the display elements provide variations in the processed data that indicate differences between:
     (i) the one or more operating conditions of the respective vehicle at a particular portion of the track during a current lap, and
     (ii) the one or more operating conditions of the respective vehicle at the particular portion of the track during a prior lap; and
causing additional display elements to be concurrently displayed at the interface, with the display elements, based on the processed data from the remote device,
   wherein the additional display elements include a representation of the multiple vehicles on the track in which the multiple vehicles are currently traveling.

2. The method of claim 1, wherein the additional display elements further include a trend line that extends along a portion of the representation of the track on which the multiple vehicles are traveling, and the method further comprises:
   receiving an input for modifying an orientation of the portion of the representation of the track in three dimensions; and
   causing the portion of the representation of the track to be re-oriented according to the received input.

3. The method of claim 1, wherein the first network connection is a Bluetooth connection and the second network connection is an LTE connection or a Wi-Fi connection.

4. The method of claim 1, wherein the computing device is external to each respective vehicle that is currently traveling on the track.

5. The method of claim 4, wherein the representation of the track includes identifiers for the multiple vehicles that are also on the track.

6. The method of claim 5, wherein the representation of the track includes colors that change across the representation of the track according to variations in the processed data from the multiple smart tracker devices connected to the multiple vehicles.

7. The method of claim 6, wherein the variations in the processed data are time differences between current laps being performed by the multiple vehicles on the track and historical lap data associated with the multiple vehicles.

8. A non-transitory computer readable medium storing instructions that, when executed by one or more processors, cause the one or more processors to perform operations that include:
   receiving, via a first network connection, data from multiple smart tracker devices connected to multiple vehicles traveling along a track,
     wherein each smart tracker device of the multiple smart tracker devices is connected to one or more respective sensors that are responsive to one or more operating conditions of a respective vehicle of the multiple vehicles;
   transmitting, via a second network connection, at least a portion of the data to a remote device for processing;
   receiving, via the second network connection, processed data from the remote device;
   causing display elements to be displayed at an interface of a computing device based on the data received from the multiple smart tracker devices,
     wherein the display elements provide variations in the processed data that indicate differences between:
       (i) the one or more operating conditions of the respective vehicle at a particular portion of the track during a current lap, and
       (ii) the one or more operating conditions of the respective vehicle at the particular portion of the track during a prior lap; and
   causing additional display elements to be concurrently displayed at the interface, with the display elements, based on the processed data from the remote device,
     wherein the additional display elements include a representation of the multiple vehicles on the track in which the multiple vehicles are currently traveling.

9. The non-transitory computer readable medium of claim 8, wherein the first network connection is a Bluetooth connection and the second network connection is an LTE or a Wi-Fi connection.

10. The non-transitory computer readable medium of claim 8, wherein the additional display elements further include a trend line that extends along a portion of the representation of the track on which the multiple vehicles are traveling, and the operations further include:
   receiving an input for modifying an orientation of the portion of the representation of the track in three dimensions; and
   causing the portion of the representation of the track to be re-oriented according to the received input.

11. The non-transitory computer readable medium of claim 8, wherein the computing device is external to each respective vehicle that is currently traveling on the track.

12. The non-transitory computer readable medium of claim 11, wherein the representation of the track includes identifiers for the multiple vehicles that are also on the track.

13. The non-transitory computer readable medium of claim 12, wherein the representation of the track includes colors that change across the representation of the track according to variations in the processed data from the multiple smart tracker devices connected to the multiple vehicles.

14. The non-transitory computer readable medium of claim 13, wherein the variations in the processed data are time differences between current laps being performed by the multiple vehicles on the track and historical lap data associated with the multiple vehicles.

15. A system, comprising:
   one or more processors; and
   memory configured to store instructions that, when executed by the one or more processors, cause the one or more processors to perform operations that include:
     receiving, via a first network connection, data from multiple smart tracker devices connected to multiple vehicles traveling along a track,
       wherein each smart tracker device of the multiple smart tracker devices is connected to one or more respective sensors that are responsive to one or more operating conditions of a respective vehicle of the multiple vehicles;
     transmitting, via a second network connection, at least a portion of the data to a remote device for processing;
     receiving, via the second network connection, processed data from the remote device;
     causing display elements to be displayed at an interface of a computing device based on the data received from the multiple smart tracker devices,
       wherein the display elements provide variations in the processed data that indicate differences between:

(i) the one or more operating conditions of the respective vehicle at a particular portion of the track during a current lap, and
(ii) the one or more operating conditions of the respective vehicle at the particular portion of the track during a prior lap; and causing additional display elements to be concurrently displayed at the interface, with the display elements, based on the processed data from the remote device, wherein the additional display elements include a representation of the multiple vehicles on the track in which the multiple vehicles are currently traveling.

16. The system of claim 15, wherein the additional display elements further include a trend line that extends along a portion of the representation of the track on which the vehicle is traveling, and the operations further include:

receiving an input for modifying an orientation of the portion of the representation of the track in three dimensions; and causing the portion of the representation of the track to be re-oriented according to the received input.

17. The system of claim 15, wherein the computing device is external to each respective vehicle that is currently traveling on the track.

18. The system of claim 17, wherein the representation of the track includes identifiers for the multiple vehicles that are also on the track.

19. The system of claim 18, wherein the representation of the track includes colors that change across the representation of the track according to variations in the processed data from the multiple smart tracker devices connected to the multiple vehicles.

20. The system of claim 19, wherein the variations in the processed data are time differences between current laps being performed by the multiple vehicles on the track and historical lap data associated with the multiple vehicles.

* * * * *